(12) United States Patent
Lan

(10) Patent No.: US 6,397,124 B1
(45) Date of Patent: May 28, 2002

(54) INTERACTIVE SYSTEM BETWEEN MACHINE TOOL AND OPERATOR

(75) Inventor: Huai-Sheng Lan, Taichung (TW)

(73) Assignee: Falcon Machine Tools Co., Ltd., Taichung (TW)

( * ) Notice: Subject to any disclaimer, the term of this patent is extended or adjusted under 35 U.S.C. 154(b) by 0 days.

(21) Appl. No.: 09/309,593

(22) Filed: May 11, 1999

(51) Int. Cl.[7] .......................... G06F 19/00; B24B 49/00
(52) U.S. Cl. ............................. 700/185; 700/172.181; 700/184; 451/5
(58) Field of Search .............................. 700/180, 172, 700/181, 184, 183, 185, 194, 164; 451/5

(56) References Cited

U.S. PATENT DOCUMENTS

| | | | | |
|---|---|---|---|---|
| 3,664,066 A | * | 5/1972 | Clark, Jr. ..................... | 451/4 |
| 4,490,946 A | * | 1/1985 | Tsujiuchi et al. .............. | 451/5 |
| 4,556,833 A | * | 12/1985 | Kishi et al. ................... | 318/567 |
| 5,083,401 A | * | 1/1992 | Yamashita et al. ............ | 451/5 |
| 5,184,306 A | * | 2/1993 | Erdman et al. ............... | 345/419 |
| 5,400,260 A | * | 3/1995 | Matsumura et al. .......... | 700/180 |
| 5,469,352 A | * | 11/1995 | Yukutomo et al. ............ | 700/180 |
| 5,610,842 A | * | 3/1997 | Seki et al. ..................... | 345/473 |
| 5,619,415 A | * | 4/1997 | Seki et al. ..................... | 700/180 |
| 5,815,400 A | * | 9/1998 | Hirai et al. ................... | 700/173 |
| 5,862,056 A | * | 1/1999 | Iwata et al. ................... | 700/184 |
| 6,112,133 A | * | 8/2000 | Fishman ....................... | 700/182 |
| 6,285,915 B1 | * | 9/2001 | Miura et al. .................. | 700/180 |

* cited by examiner

Primary Examiner—William Grant
Assistant Examiner—Paul Rodriguez
(74) Attorney, Agent, or Firm—Browdy and Neimark

(57) ABSTRACT

An interactive system involves a machine tool and an operator of the machine tool comprising a controller. The controller is formed of a central processing unit and a control panel connected with the central processing unit. The interactive system comprises a storage unit connected with the central processing unit and composed of a public data area and a program data area, a profile path editor disposed in the central processing unit and connected with the storage unit for converting a workpiece profile coordinate into an actual workpiece profile path pattern and a path program, and a pattern interface unit connected with the central processing unit and the storage unit for transmitting a signal from the central processing unit to the operator in the form of a pattern, so as to guide the operator to enter a finishing condition to actuate the controller to bring about a control signal to regulate the finishing operation of the machine tool.

5 Claims, 11 Drawing Sheets

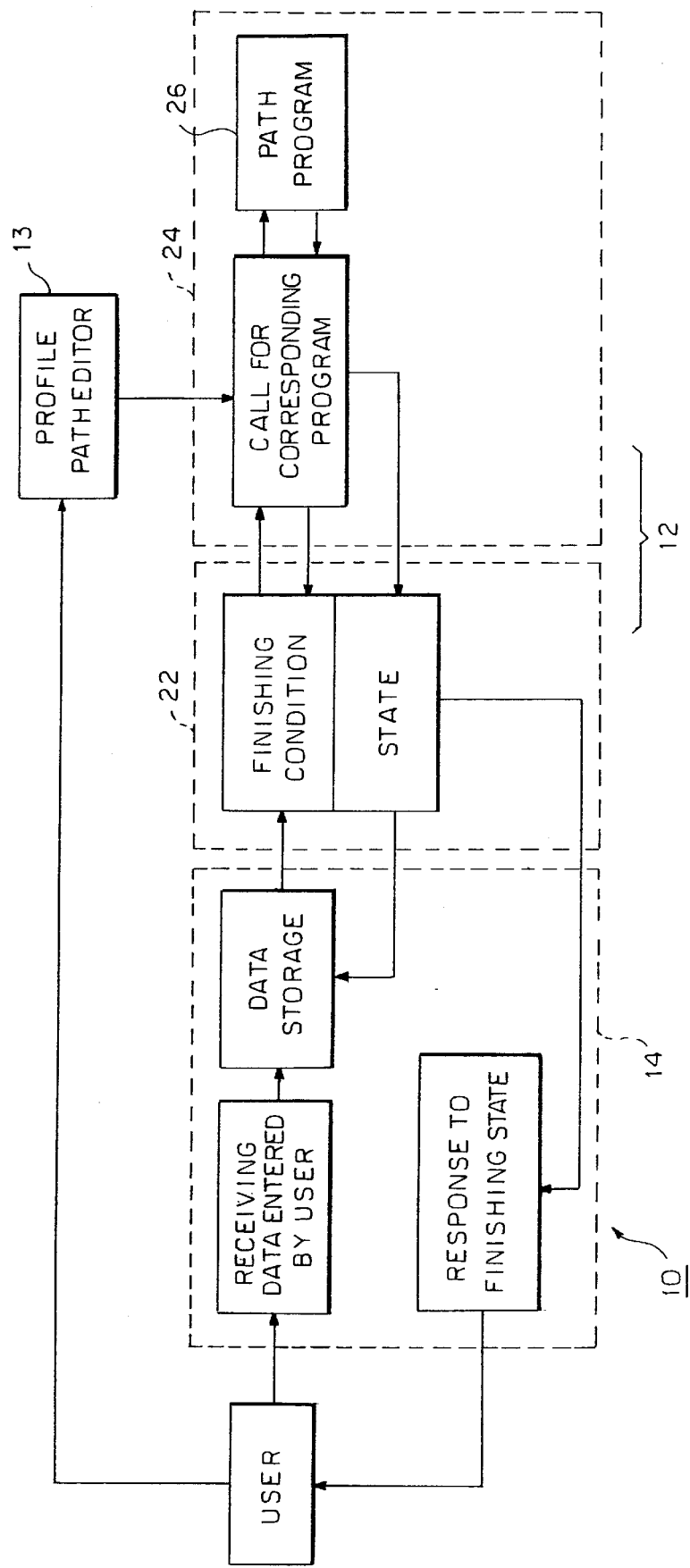

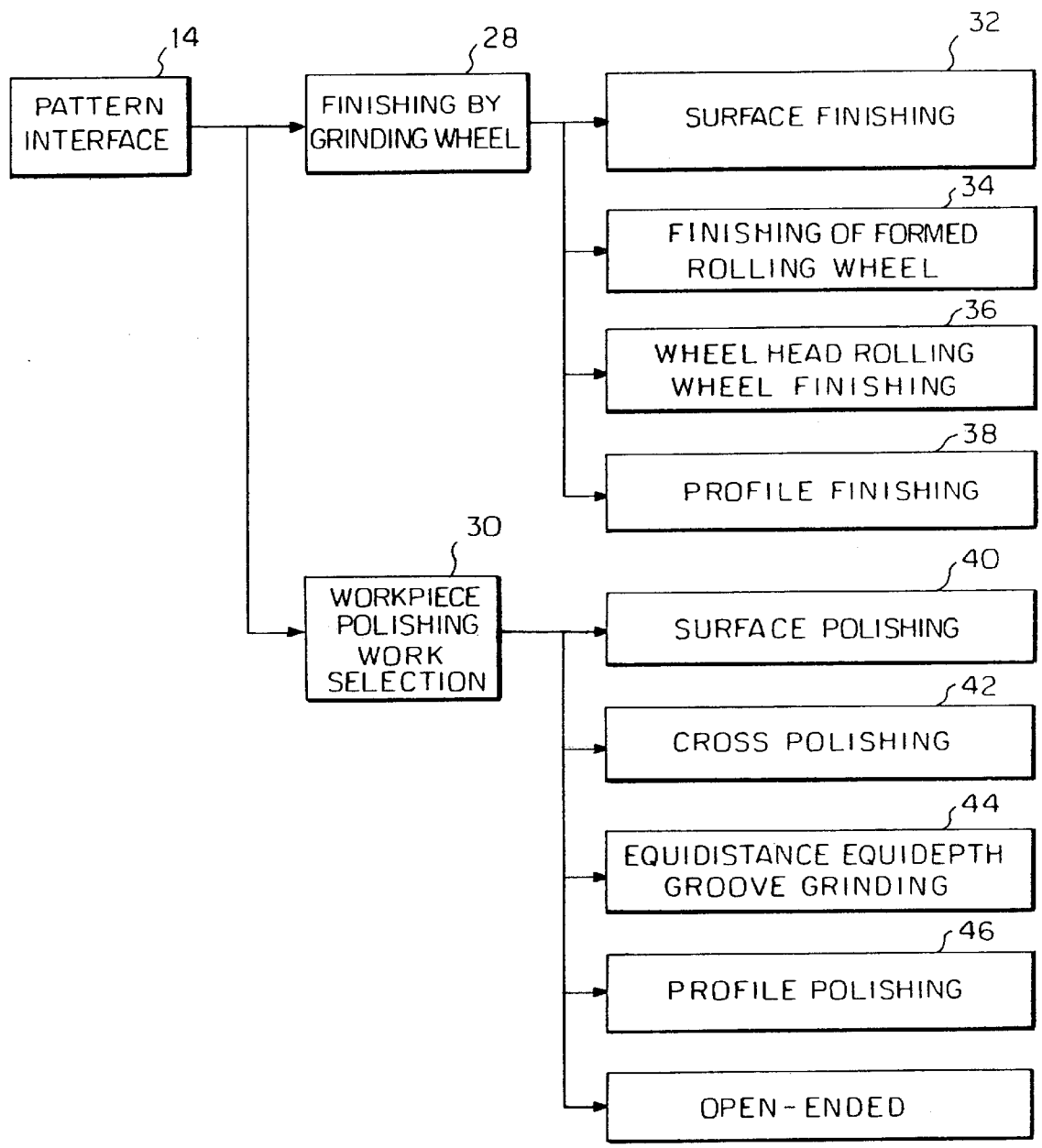

INTERACTIVE SYSTEM BETWEEN MACHINE TOOL AND OPERATOR

FIELD OF THE INVENTION

The present invention relates generally to a machine tool, and more particularly to an interactive system between the machine tool and an operator of the machine tool.

BACKGROUND OF THE INVENTION

The old-fashioned machine tool was manually operated and was thus inefficient. The CNC machine tool is a piece of modern machinery and is relatively more efficient. However, the operation of the CNC controller for later use such that the instructions of a machine operator trigger the program to bring about a specific performance of the machine tool. The drawback of the CNC machine tool is the programming which is rather time-consuming.

SUMMARY OF THE INVENTION

The primary objective of the present invention is therefore to provide an interactive system involving a mode of operation in which there is a continual exchange of information in the form of graph between a machine tool and an operator of the machine tool such that the machine tool is instructed by the operator to execute the program that is pre-stored in the controller of the machine tool. As the workpiece profile coordinate data are entered by the operator, the actual path is automatically edited by the interactive system so as to execute the finishing operation. The complicated and time-consuming work of programming the operations to be performed by the machine tool is thus averted.

The interactive system of the present invention involves a machine tool and an operator of the machine tool. The machine tool comprises a controller which is formed of a central processing unit, a control panel connected with the central processing unit, a storage unit connected with the central processing unit for keeping data and programs with regard to the finishing operation of the machine tool, a profile path editor disposed in the central processing unit and connected with the storage unit for converting the workpiece profile coordinate into the actual profile path, and pattern interface unit connected with the central processing unit and the storage unit for transmitting the signal in the form of pattern to the operator, so as to enable the controller to bring about the control signals in accordance with the instructions given by the operator. The machine tool is thus controlled by the control signals to execute a predetermined operation.

BRIEF DESCRIPTION OF THE DRAWINGS

FIG. 1 shows a basic framework of a preferred embodiment of the present invention.

FIG. 2 shows contents of a specific finishing program of the preferred embodiment of the present invention.

FIG. 3 shows a framework of the pattern interface of the preferred embodiment of the present invention.

DETAILED DESCRIPTION OF THE INVENTION

Figure 4:
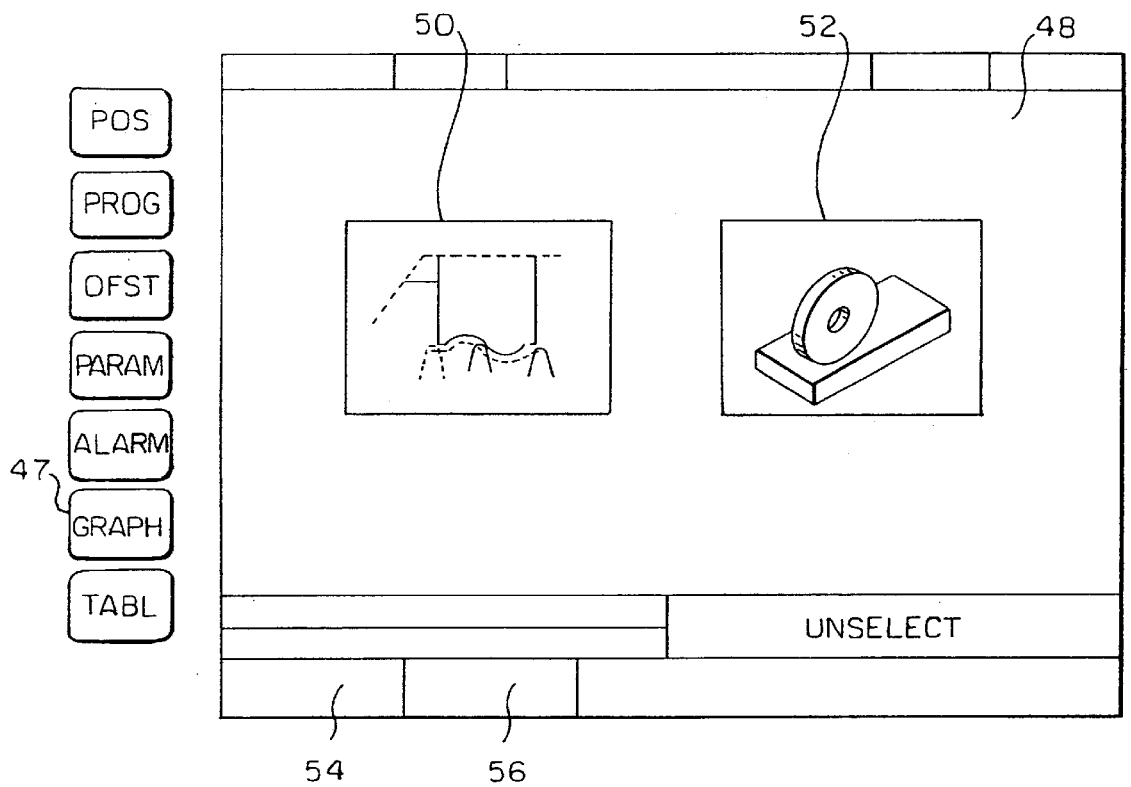
FIG. 4 is a work selection frame of the preferred embodiment of the present invention, showing the work selection of the grinding wheel finishing and the workpiece grinding.

As shown in FIG. 1, a man-machine interactive system 10 embodied in the present invention is disposed in a controller of a grinding machine and composed of a storage unit 12, a profile path editor 13, and a pattern interface unit 14.

The storage unit 12 is a variable memory and is connected with the central processing unit (CPU) of the controller. The storage unit 12 comprises a public data area 22 and a program data area 24. The public data area 22 is used for a temporary storage of the finishing condition data which are transmitted from the control panel (not shown in the drawing) of the controller. The program data area 24 comprises a grinding wheel finishing program that can be executed alone, a workpiece polishing program, and a special finishing program 26 which is a path finishing program, including a macro collection of instructions regulating the basic action such as execution of grinding machine tool (grinding wheel) and capable of being called by the grinding wheel finishing program or the workpiece polishing program of the storage unit 12, so as to execute the controlling of the tool. The program contents of the path finishing program are shown in FIG. 2, in which the meanings of the parameter symbols of each instruction are indicated as follows:

The first instruction 0: program code

The second instruction:
  B: tool advancing increment
  C: free pass times between two tool advances
  D: global variable number of actual tool advancing quantity of this finishing, which is to be transmitted back to the called program.
F: finishing advance speed
  H: finishing mode selection (1: finished workpiece; 0: unfinished workpiece)
  I: spark-out times The third instruction:

P: path describing program (auxiliary program) number
Y: Y-axis path starting point coordinate Z: Z-axis path starting point coordinate K: starting point of tool measurement
E: Is the path starting point equal to the starting point of tool measurement? (1; yes; O: no)
D: tool radius The fourth instruction M30: end of program. The profile path editor is disposed in the CPU of the controller and is connected with the storage unit 12 for converting the workpiece profile coordinate into the workpiece actual profile, and the path program which is stored in the program data area 24 of the storage unit 12. The workpiece profile coordinate referred to above is entered by the machine operator via the control panel of the controller of the grinding machine.

The pattern interface unit 14 is the screen of the controller and is used to transmit the signals generated by the CPU to the user in the form of pattern for guiding the user to store the data on the finishing condition in the storage unit 12 via the control panel of the controller. Now referring to FIG. 3, the contents of data shown by the pattern interface unit 14 include a grinding wheel finishing work selection 28 and a workpiece polishing work selection 30. The grinding wheel finishing work selection 28 has the functional selections of a surface finishing 32, a formed rolling wheel finishing 34, a wheel head rolling wheel finishing 36, and a profile finishing 38. The workpiece polishing work selection 30 has functional selections of a surface polishing 40, a cross polishing 42, an equidistance equidepth groove grinding 44, and a profile polishing 46. In fact, the functional selections of the grinding wheel finishing work selection 28 and the workpiece polishing work selection 30 are open-ended.

Figure 5:
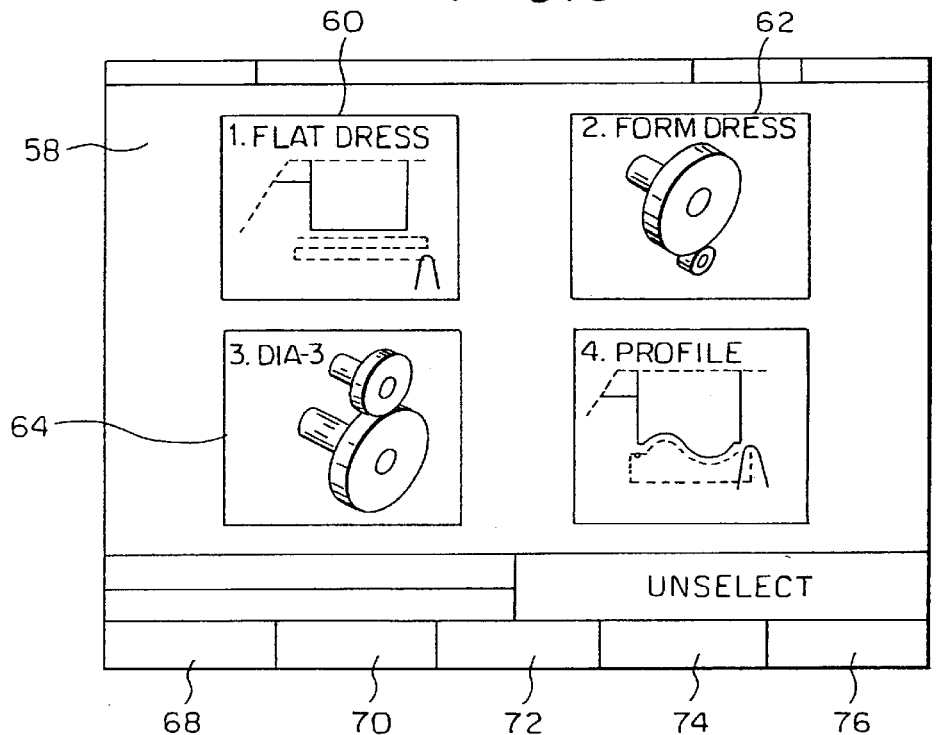
FIG. 5 shows a functional selection frame of the grinding wheel finishing of the preferred embodiment of the present invention.
Figure 6:
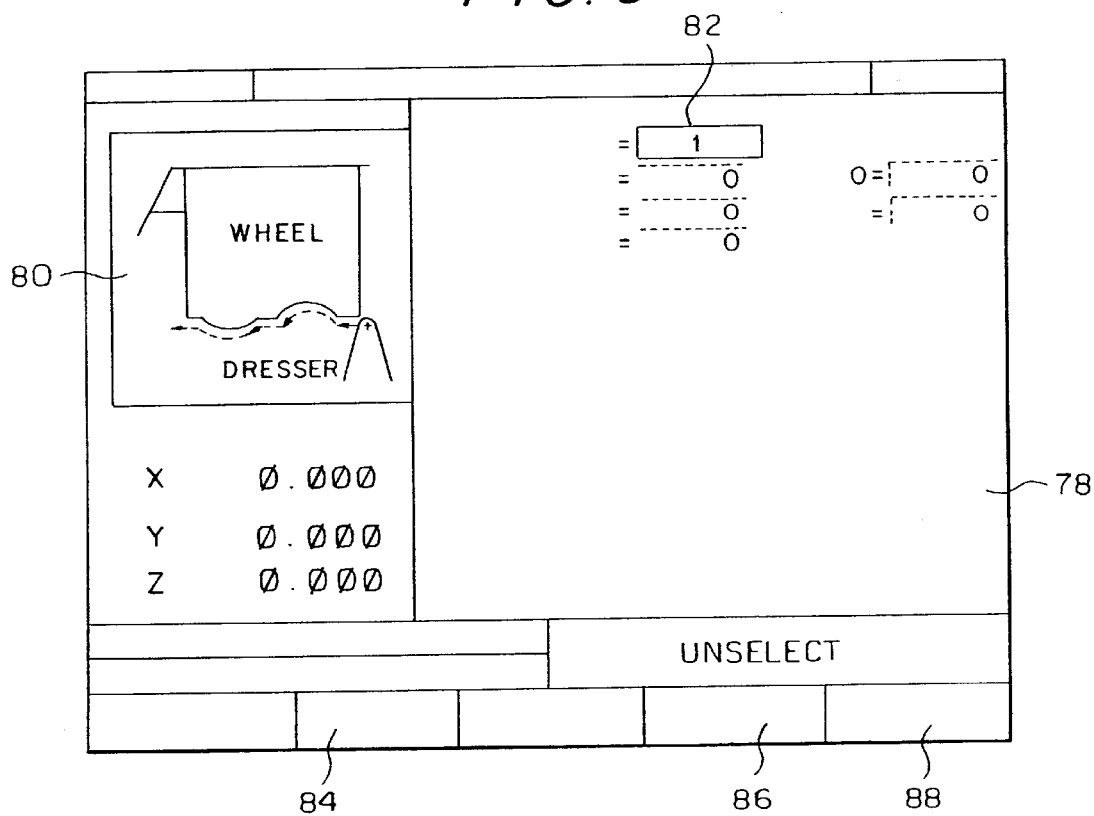
FIGS. 6 and 7 show contents frames set up for the profile finishing function of the preferred embodiment of the present invention.
Figure 7:
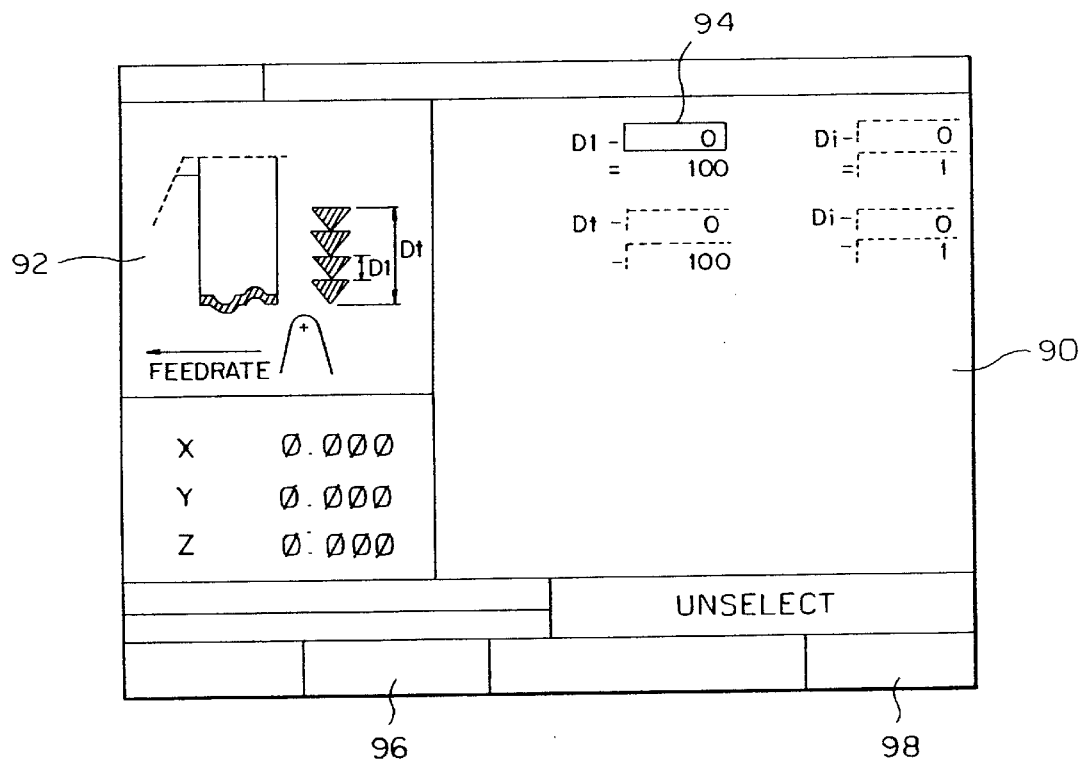
Figure 8:
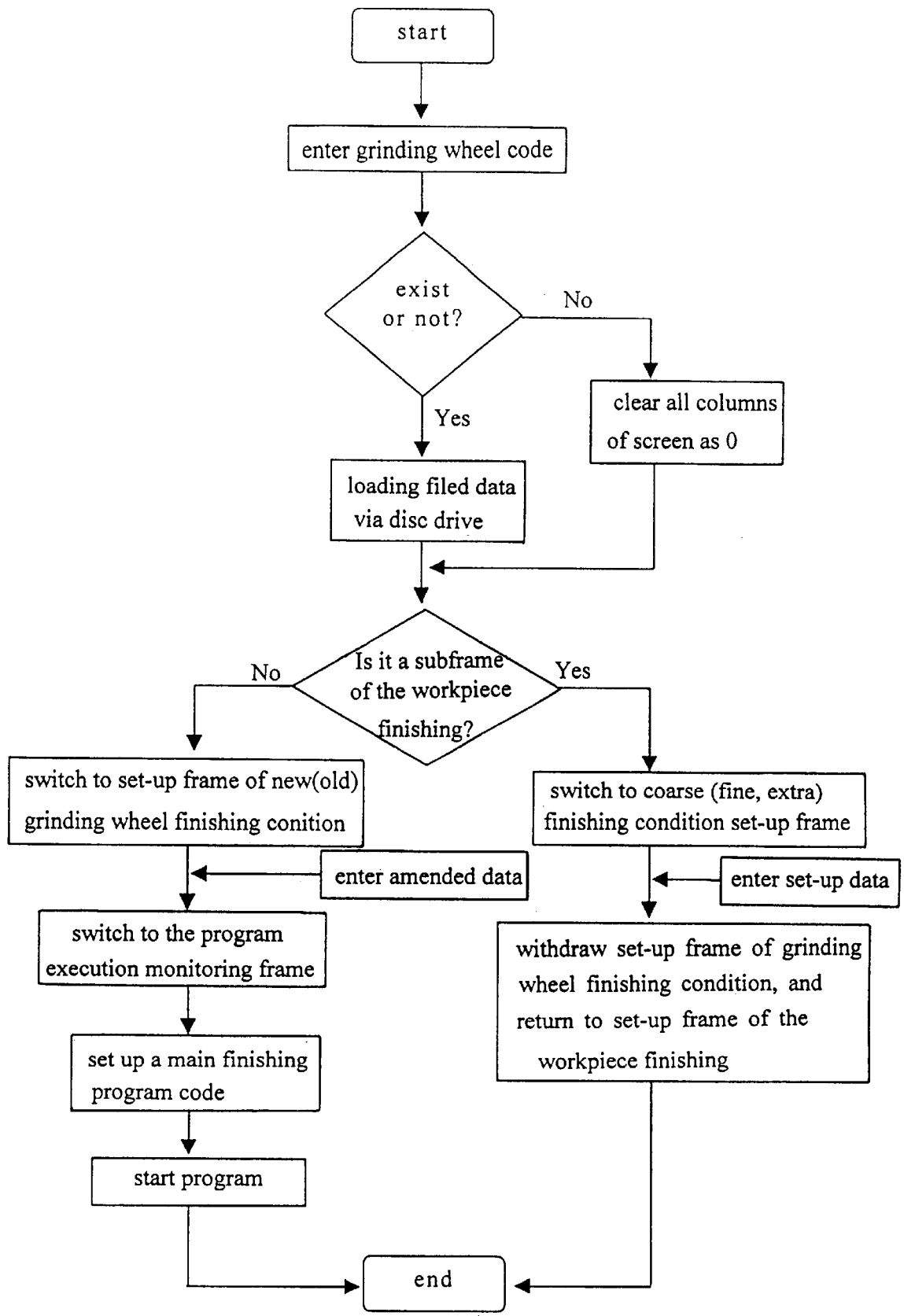
FIG. 8 shows a pattern interactive operational flow chart of the grinding wheel finishing of the preferred embodiment of the present invention.

As shown in FIG. 4, the first step of using the interactive system 10 is to press a function fast key "GRAPH" 47 of the control panel of the grinding machine. As a result, a frame 48 is shown in the controller. The frame 48 includes a grinding wheel finishing pattern 50 and a workpiece 113 polishing pattern 52. Depending on the requirement of the finishing condition, the machine operator may select a finishing key 54 or a polishing key 56. When the finishing key 54 is pressed, the controller shows another frame 58, as shown in FIG. 5. The frame 58 has a surface finishing pattern 60, a formed rolling wheel finishing pattern 62, a wheel head rolling wheel finishing pattern 64, and a profile finishing pattern 66. Located under the frame 58 are a surface finishing key 68, a formed rolling wheel finishing key 70, a wheel head rolling wheel finishing key 72, a profile finishing key 74, and a withdrawal key 76. When the operator presses the profile finishing key 74, the controller shows a first frame 78 relating to the profile finishing function, as shown in FIG. 6. The frame 78 has a profile finishing pattern 80, a parameter set-up area 82, an execution key 84, a deletion key 86, and a withdrawal key 88. The parameter set-up area 82 has a grinding wheel number, the grinding wheel surface speed, the grinding wheel outer diameter, the grinding wheel width, the zero grinding number, and the Y-axis safe altitude coordinate. Now referring to FIG. 7, the second frame 90 has a profile finishing pattern 92, a parameter set-up area 94, an execution key 96, and a withdrawal key 98. The parameter set-up area 94 comprises two status establishments of a new grinding wheel finishing and a finished grinding wheel finishing. The contents of each status establishment include a finishing sum, a finishing increment, a finishing speed, and a lost motion number. The operational flow chart of the grinding wheel finishing pattern is shown in FIG. 8.

Figure 9:
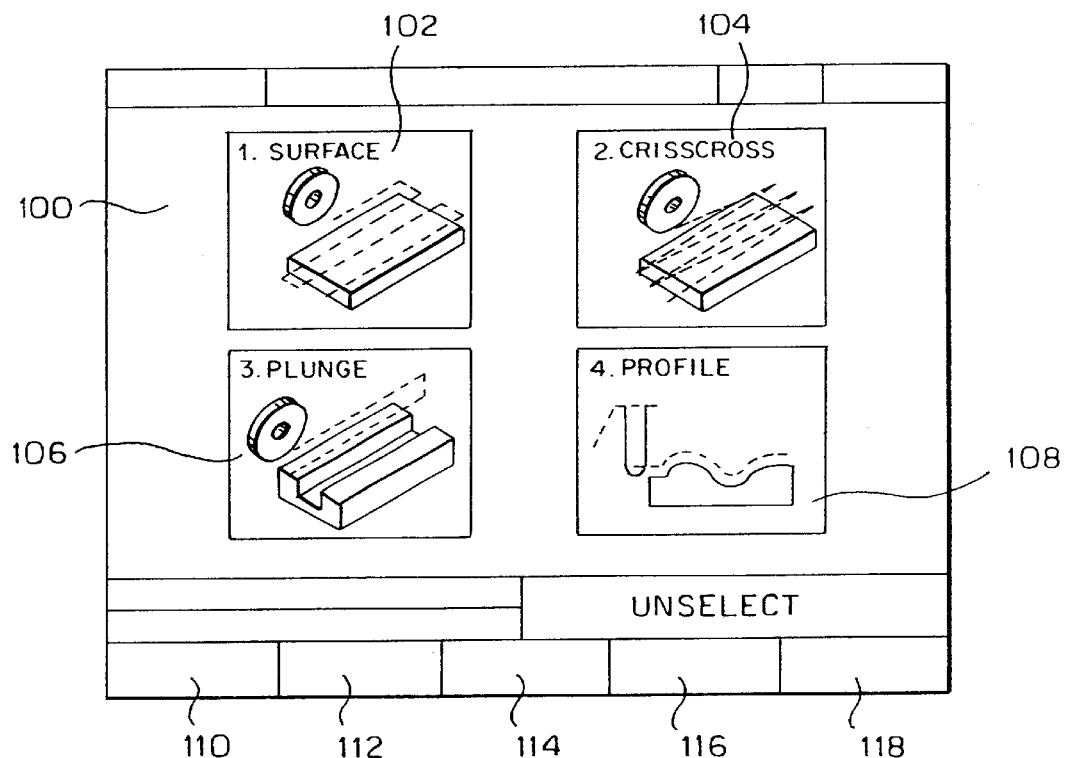
FIG. 9 shows a set-up contents frame of the workpiece polishing function of the preferred embodiment of the present invention.
Figure 10:
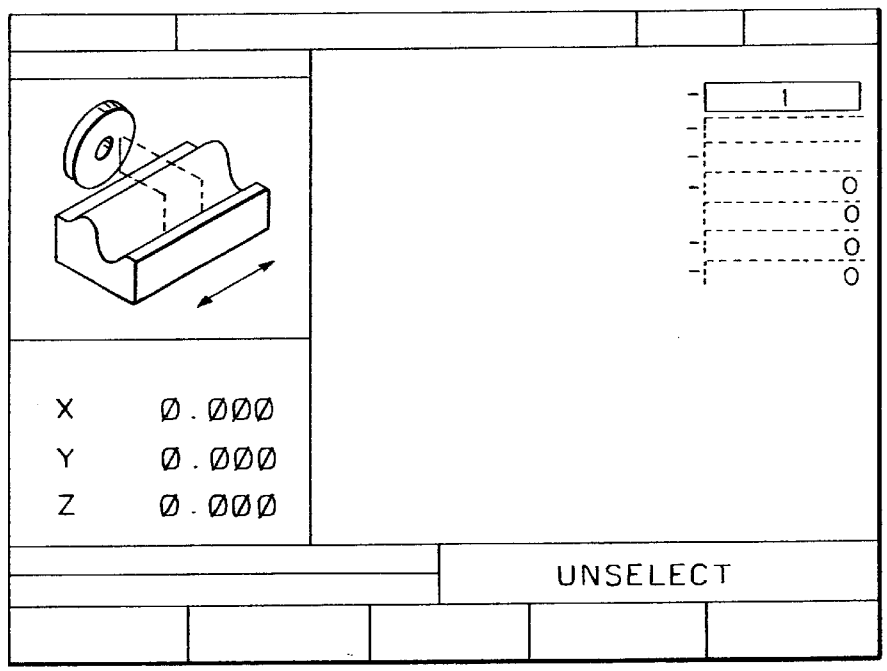
FIGS. 10 and 11 shown set-up contents frames of the workpiece polishing function of the preferred embodiment of the present invention.
Figure 11:
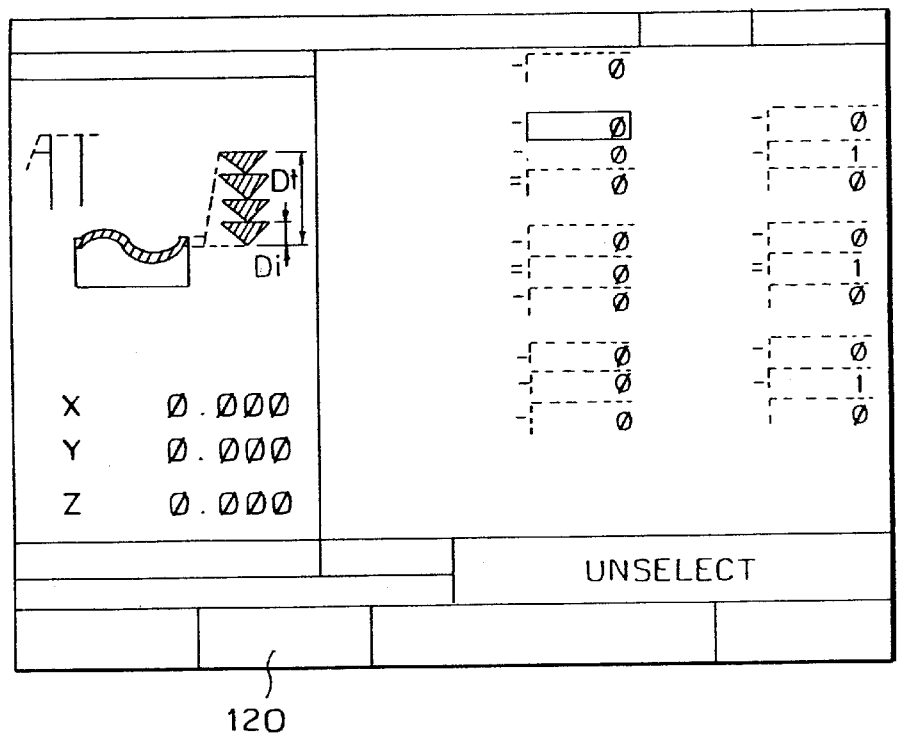
Figure 12:
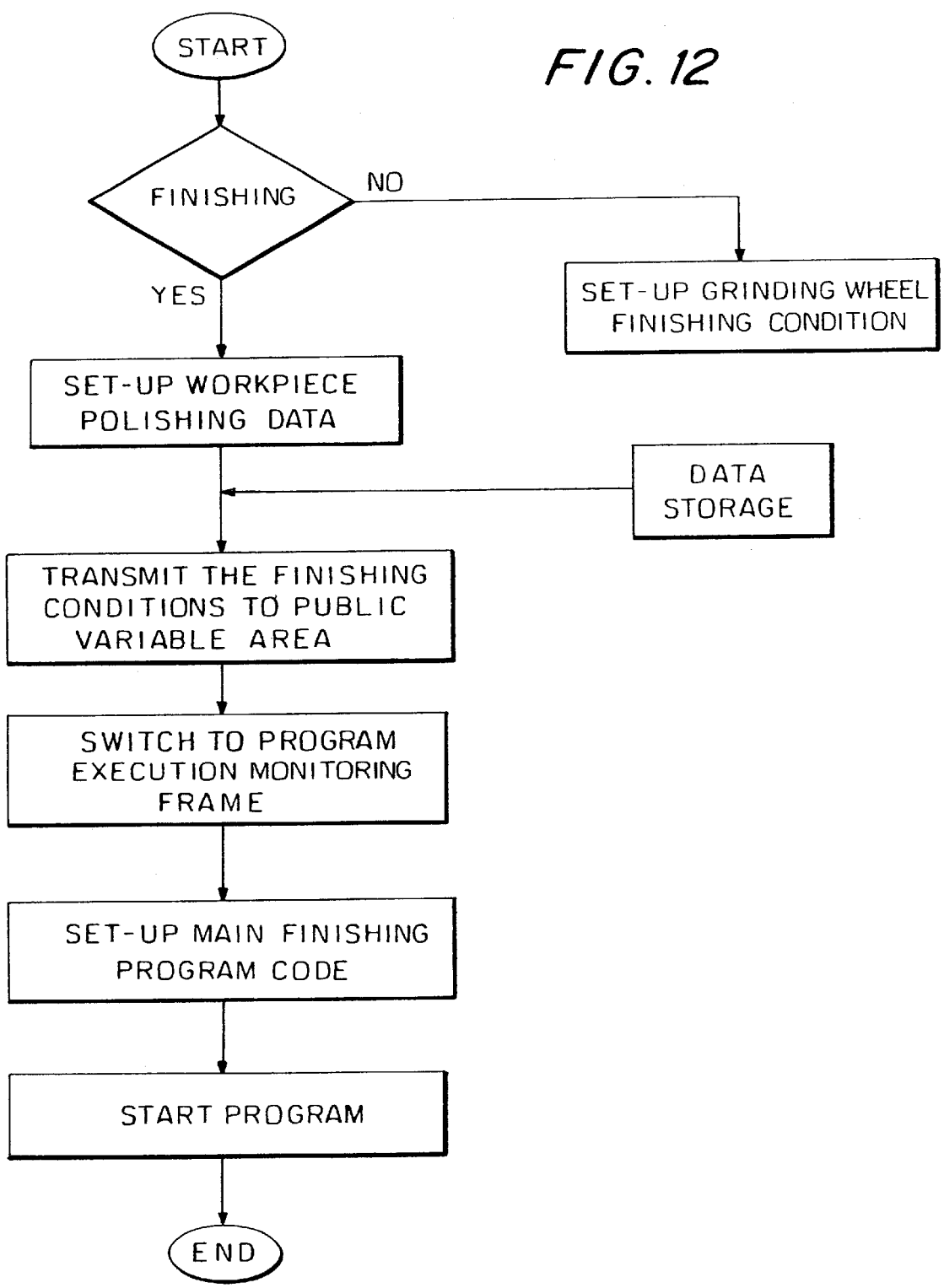
FIG. 12 shows a pattern interactive operational flow chart of the workpiece polishing of the preferred embodiment of the present invention.

As shown in FIG. 9, when the polishing key 56 is pressed by the operator, the controller shows a frame 100 which has a surface polishing pattern 102, a cross polishing pattern 104, an equidistance equidepth groove polishing pattern 106, and a profile polishing pattern 108. Located under the frame 100 are a surface polishing key 110, a cross polishing key 112, an equidistance equidepth groove polishing key 114, a profile polishing key 116, and a withdrawal key 118. As shown in FIGS. 10 and 11, when the profile polishing key 116 is pressed by the operator, the screen of the controller shows all set-up contents regarding the workpiece profile polishing. The operator may make an appropriate selection. The interactive operational flow chart of the workpiece polishing pattern is shown in FIG. 12.

Figure 13:
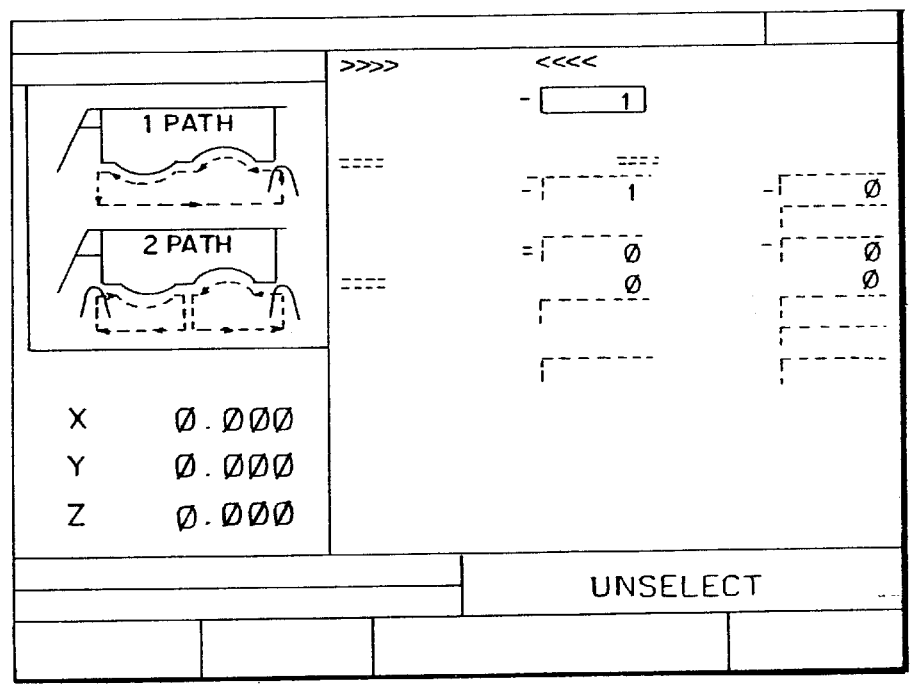
FIG. 13 shows a path set-up frame of the profile finishing function of the grinding wheel finishing work of the preferred embodiment of the present invention.
Figure 14:
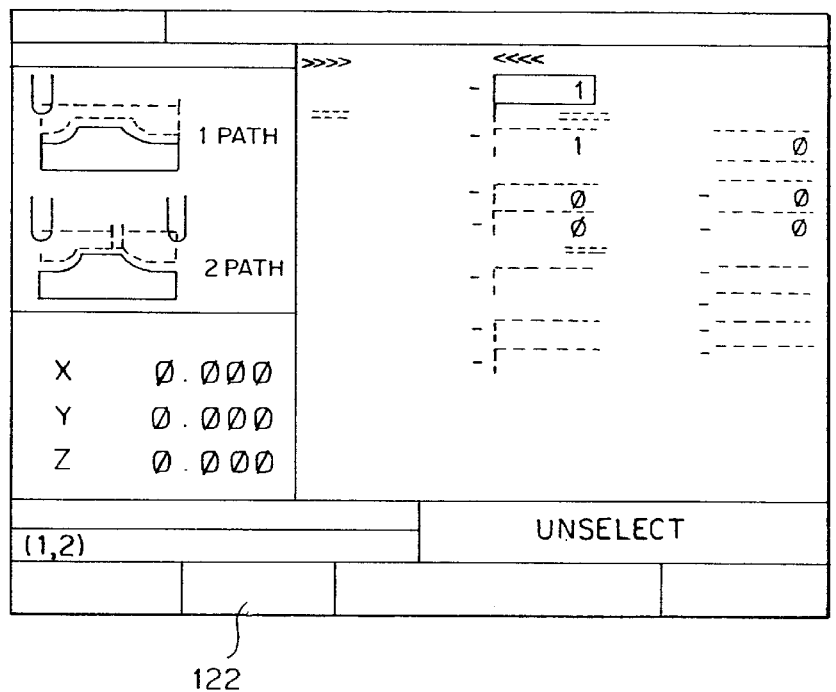
FIG. 14 shows a path set-up frame of the profile finishing function of the workpiece polishing work of the preferred embodiment of the present invention.
Figure 15:
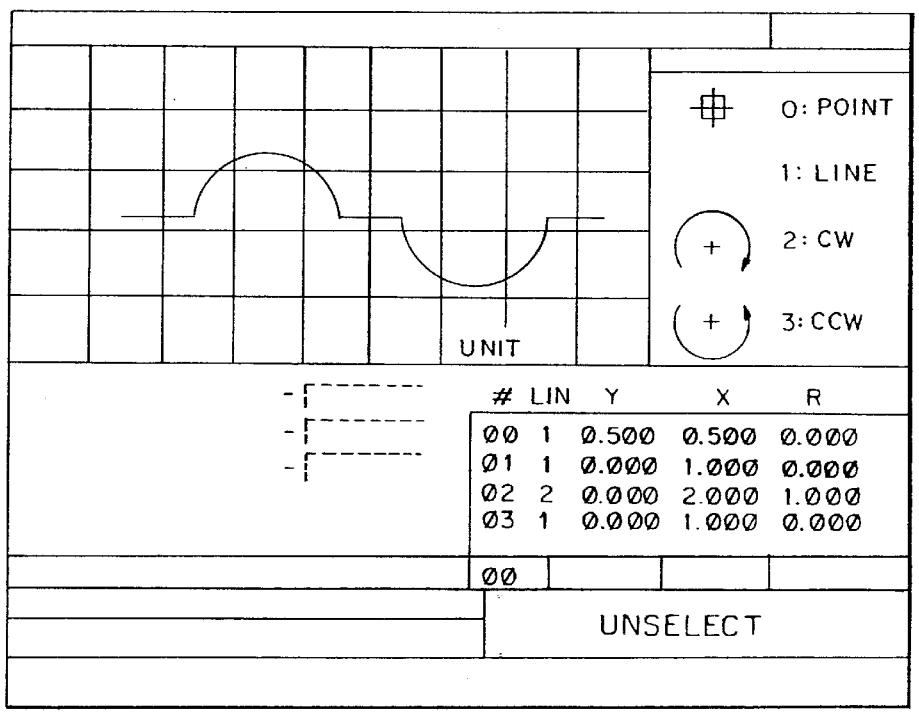
FIG. 15 shows a path editing frame of the preferred embodiment of the present invention.
Figure 16:
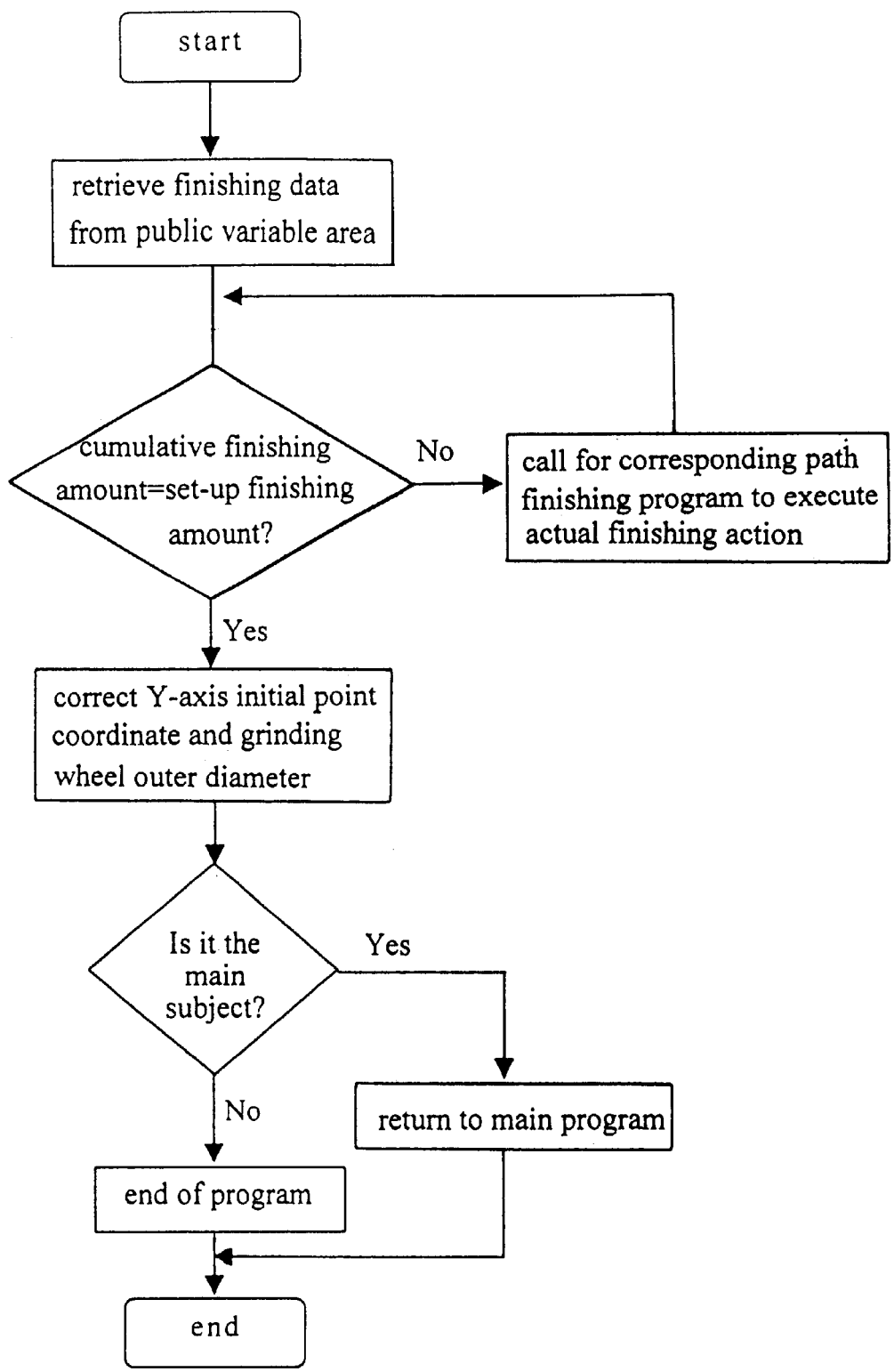
FIG. 16 shows a program execution flow chart of the grinding wheel finishing of the preferred embodiment of the present invention.
Figure 17:
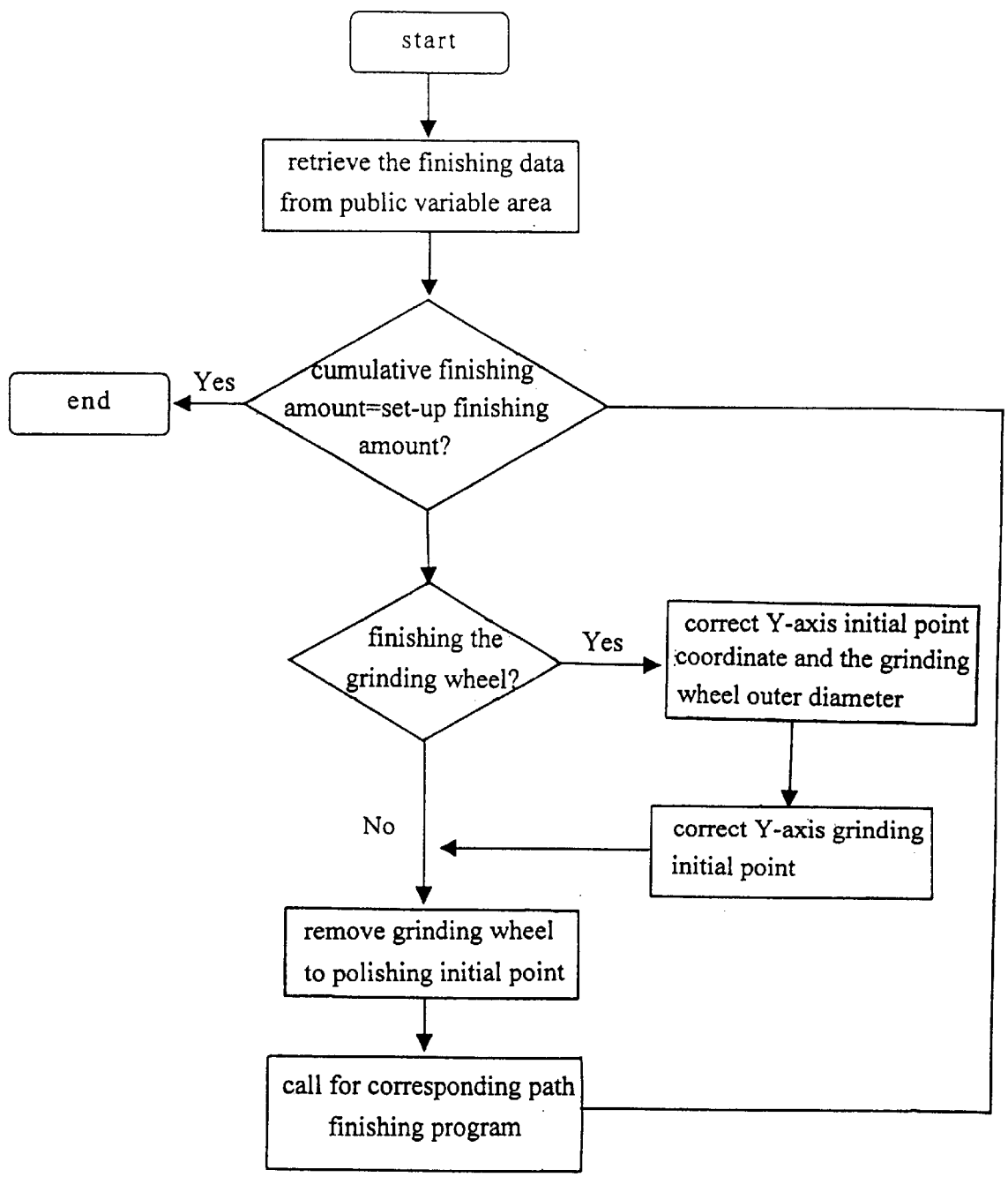
FIG. 17 shows a program execution flow chart of the workpiece polishing of the preferred embodiment of the present invention.

The grinding wheel finishing work selection 28 and the workpiece polishing work selection 30 further have an editing finishing function or a polishing path function. As shown in FIGS. 13 and 14, the path is edited by entering respectively the frames of the profile finishing 74 and the profile polishing 116. Thereafter, press the execution keys 120, 122 under the function selections of "path one edit", so as the attain the path editing frame. The operator enters the workpiece profile coordinate into the two frames, the workpiece actual profile is then shown in the frame, as shown in FIG. 15, thereby enabling one to determine the path of the grinding wheel finishing or the surface polishing, which may be filed. The execution flow charts of the grinding wheel finishing and the workpiece polishing are shown in FIGS. 16 and 17.

As described above, the interactive system 10 of the present invention enables the finishing data to be transmitted in the form of graph or pattern to the operator via the pattern interface unit 14. The operator is thus guided to select the work selection or to set up the finishing condition so as to enable the machine tool to execute the finishing program. In addition, the actual workpiece profile path can be edited automatically by the system of the present invention by entering the workpiece profile coordinate into the controller of the system of the present invention. As a result, the tedious and time-consuming task of writing a finishing program is thus eliminated.

What is claimed is:

1. An interactive system between a machine tool and an operator of the machine tool, the machine tool comprising a controller which comprises a central processing unit, and a control panel connected with the central processing unit, said interactive system comprising:

a storage unit connected with the central processing unit and comprising a public data area and a program data area whereby said public data area is for use in storing temporarily finishing condition data which are entered via the control panel of the controller and whereby said program data area is used to store finishing programs, and a special finishing program which is intended to regulate the advancing motion of a tool of the machine tool;

a profile path editor disposed in the central processing unit and connected with said storage unit for converting a workpiece profile coordinate into an actual workpiece profile path and a path program whereby said path program is stored in said storage unit; and a pattern interface unit connected with the central processing unit and said storage unit for transmitting a specific signal generated by the central processing unit to the operator in the form of pattern, so as to guide the operator to enter a finishing condition into said storage unit via the control panel whereby said finishing condition actuates the controller to bring about a control signal to activate one of said finishing programs and said special finishing program to enable the machine tool to execute a finishing operation;

wherein said storage unit is a variable memory, and said program data area stores a grinding wheel finishing program and a workpiece polishing program.

2. The system as defined in claim 1, wherein said grinding wheel finishing program comprises instructions for a surface finishing, a formed rolling wheel finishing, a wheel head rolling wheel finishing, and a profile finishing.

3. The system as defined in claim 1, wherein said workpiece polishing program comprises instructions for a surface polishing, a cross polishing, an equidistance equidepth groove polishing, and a profile polishing.

4. The system as defined in claim 1, wherein said grinding wheel finishing program is an auxiliary program when said grinding wheel finishing program is called by said workpiece polishing program.

5. The system as defined in claim 1, wherein said special finishing program is a macro collection of instructions for executing the operation of a tool of the machine tool.

* * * * *